G. BENNETT.
HOSE RACK.
APPLICATION FILED JAN. 8, 1909.
965,432.
Patented July 26, 1910.
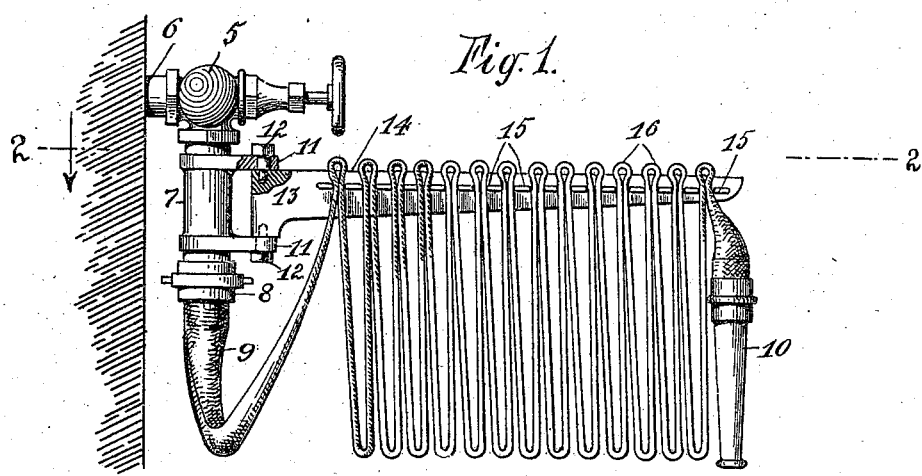
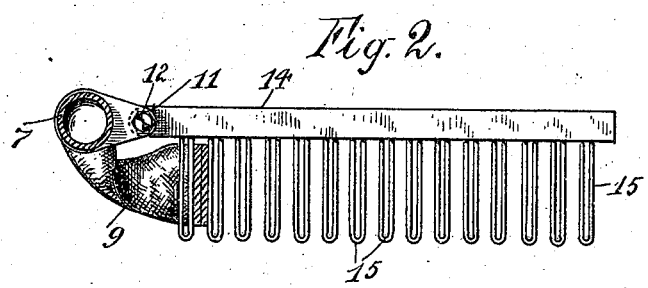
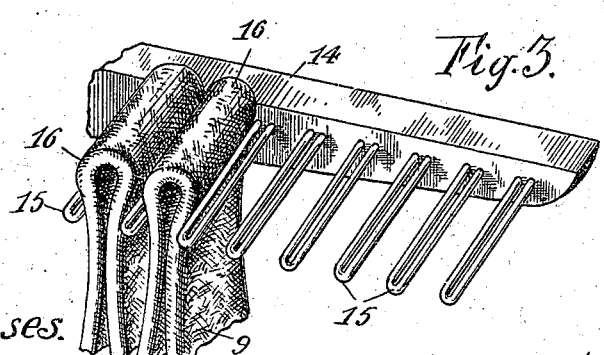
Witnesses
Inventor,
George Bennett,

UNITED STATES PATENT OFFICE.

GEORGE BENNETT, OF LOS ANGELES, CALIFORNIA.

HOSE-RACK.

965,432.   Specification of Letters Patent.   Patented July 26, 1910.

Application filed January 8, 1909. Serial No. 471,334.

*To all whom it may concern:*

Be it known that I, GEORGE BENNETT, a citizen of the United States, residing at Los Angeles, in the county of Los Angeles and State of California, have invented new and useful Improvements in Hose-Racks, of which the following is a specification.

My invention relates more specifically to swinging hose racks used in hotels and like places for suspending fire hose therefrom, and an important object thereof is to provide a novel form of rack by means of which the hose may be readily attached thereto or withdrawn therefrom.

A further object is to provide a novel form of rack whereby I am enabled to dispense with all hose supporting pins, rings and the like which often form an impediment to the ready withdrawal of the hose from the rack.

In the accomplishment of the above objects I have provided a swinging support adapted to be pivotally secured to the water supply pipe, having rigidly secured thereto a plurality of resilient pins or teeth extending at right angles therefrom which are adapted to receive and support the folded hose.

In the drawings hereto attached forming a part of the specification:—Figure 1— is a side elevation of my improved hose rack with the hose folded thereon. Fig. 2— is a sectional plan view of the rack and supporting member taken on line 2—2 of Fig. 1. Fig. 3— is an enlarged perspective view of a detail of the outer portion of the hose supporting rack.

In the improved form of rack shown in the drawings a controlling valve 5, of usual construction, is connected directly to water supply pipe 6. In the construction shown, this valve is an angle valve, and its downwardly extending outlet is connected to water pipe 7, forming the base or supporting member of the rack. The lower end of pipe 7 is provided with a union connection 8 to hose 9, the hose being of any suitable length and provided with the usual nozzle 10 on its other end. Pipe 7 is provided with two lugs 11 which project outwardly and carry bolts 12 on their outer ends. These bolts project into the vertically enlarged end 13 of supporting arm 14 to form pivots therefor, so that the supporting arm may be swung horizontally to any position desired.

Rigidly attached to one side of the swinging arm 14 is a plurality of teeth or pins 15 preferably formed of resilient wire and which project therefrom at right angles. These teeth are here illustrated as formed of a wire bent upon itself to insure sufficient resiliency to each tooth. Teeth 15 are spaced apart a distance equal approximately the thickness of the hose when folded in loops, as clearly shown in Fig. 3 of the drawings, the upper part or fold 16 of the loop which lies above the teeth being of sufficient size to maintain the folded hose in position on the rack and properly spaced apart so that the entire surface of the hose will be exposed to the drying action of the air.

When it is desired to withdraw the hose from the rack the nozzle 10 is grasped and a quick movement will rapidly disengage the looped hose from the rack, the teeth being resilient enough to permit the fold 16 being pulled through. It will be observed that as the hose is pulled from the rack the tooth in front of each succeeding loop will be free to move forwardly and release the succeeding ones. It will also be observed that by the formation of a toothed rack I am enabled to dispense with all suspension rings, pins and the like which necessitate additional labor when replacing the hose on the rack.

Having described my invention what I claim as new and desire to secure by Letters Patent is:—

1. In apparatus of the class described a support having plurality of substantially horizontal pins spaced apart, in combination with a hose disposed in a succession of loops extending upward through the spaces between said pins and having their folds disposed above said pins, said folds offering means for supporting the hose by the lateral pressure of said pins on the outer sides of the loops and enabling the hose to be removed from the said support, by pulling the said folds downwardly through the space between said pins.

2. In apparatus of the class described a support having plurality of resilient and substantial horizontal pins spaced apart in combination with a hose disposed in a succession of loops extending upwardly in the spaces between said pins and having folds disposed above the pins, said folds offering means for supporting the hose, the resiliency of said pins enabling the same to exert a pressure on the outer sides of the loops of said hose and permitting the hose to be detached from said pins by pulling the loops downwardly between said pins.

3. A hose support having a horizontally swinging arm, a plurality of lateral projecting resilient pins disposed apart and forming spaces adapted to receive the loops of a hose passing upwardly therebetween and adapted to support said loops by lateral pressure on the outer sides thereof.

In witness that I claim the foregoing I have hereunto subscribed my name this 30th day of December, 1908.

GEORGE BENNETT.

Witnesses:
 EDMUND A. STRAUSE,
 M. A. PALMER.